United States Patent [19]
Fyfe

[11] 3,806,975
[45] Apr. 30, 1974

[54] STRUCTURAL BEARINGS

[75] Inventor: Edward R. Fyfe, Burlington, Ontario, Canada

[73] Assignee: Elastometal Limited, Burlington, Ontario, Canada

[22] Filed: Apr. 27, 1971

[21] Appl. No.: 137,896

Related U.S. Application Data
[63] Continuation-in-part of Ser. No. 27,700, April 13, 1970, abandoned.

[52] U.S. Cl. .................................. 14/16, 308/238
[51] Int. Cl. ............................................. E01d 19/06
[58] Field of Search ............ 14/16; 161/44; 308/238, 308/3; 248/22, 23

[56] References Cited
UNITED STATES PATENTS

| | | | |
|---|---|---|---|
| 2,911,207 | 11/1959 | Coble | 248/22 X |
| 3,504,902 | 4/1970 | Irwin | 308/2R X |
| 3,398,998 | 8/1968 | Burnett | 14/16 X |
| 3,397,856 | 8/1968 | Sullivan | 14/16 X |
| 2,705,928 | 4/1955 | Pont | 14/16 X |
| 809,071 | 1/1906 | Motley | 14/16 |
| 2,680,259 | 6/1954 | Milk | 14/16 |
| 3,243,236 | 3/1966 | Graham | 14/16 X |
| 3,349,418 | 10/1967 | Hein | 14/16 |
| 3,397,016 | 8/1968 | Delforce | 14/16 X |
| 3,390,854 | 7/1968 | Sherburne | 14/16 X |
| 3,484,882 | 12/1969 | Blanchette | 14/16 |

FOREIGN PATENTS OR APPLICATIONS

| | | | |
|---|---|---|---|
| 249,729 | 10/1966 | Austria | 14/16 |
| 1,525,846 | 4/1968 | France | 14/16 |
| 1,529,803 | 5/1968 | France | 14/16 |
| 206,777 | 8/1966 | Sweden | 14/16 |
| 428,826 | 7/1967 | Switzerland | 14/16 |

*Primary Examiner*—Nile C. Byers, Jr.
*Attorney, Agent, or Firm*—Stanley J. Rogers

[57] ABSTRACT

A structural bearing such as is employed in bridges and large buildings comprises a relatively thin layer of an elastomer, such as polyurethane, interposed between and bonded to two flat bearing members; at least one shear-resisting member, such as a pin passing through the elastomer layer, or a plate having its edge engaged with a ring surrounding the layer, extends between the two members and is in shear-resisting pivotal engagement with one of them in a manner to accommodate vertical compression of the elastomer and tilting of the two members. Other relative movements of the structure engaging the bearings are accommodated by relatively sliding parts thereof.

5 Claims, 5 Drawing Figures

PATENTED APR 30 1974  3,806,975

INVENTOR.
EDWARD R. FYFE
BY Church & Rogers

STRUCTURAL BEARINGS

CROSS-REFERENCE TO RELATED APPLICATION

The present application is a continuation-in-part of my application Ser. No. 27,700, filed 13th Apr. 1970, and now abandoned.

FIELD OF THE INVENTION

The invention is concerned with improvements in or relating to structural bearings, such as are employed for example in bridges and large buildings to support the static and dynamic loads of the structure, while permitting some relative movement of the parts of the structure between which the bearing is disposed.

BACKGROUND OF THE INVENTION

Structural bearing pads of the kind specified generally comprise a body of elastomeric material having reinforcing material incorporated therein, such as metal plates disposed with their flat faces generally parallel to the top and bottom faces of the bearing pad.

Generally, such bearings are loaded horizontally and vertically. The vertical load comprises the dead weight of the supported structure and any live load on the structure, and this load acts perpendicularly to the top and bottom surfaces of the bearings and is carried by the elastomeric material which is thus subjected to compression. The horizontal load is due to movement of the supported structure caused by thermal expansion and contraction and this deflects the top surface of the bearing laterally with respect to the bottom surface, so that the bearing is loaded in shear.

The size of the bearing will largely depend on the magnitude of the load to be carried. The horizontal cross-sectional area will be selected according to the maximum vertical load to be carried by the bearing and the loading capacity of the elastomeric material. The vertical height of the bearing will depend, among other factors, upon the vertical thickness of the elastomeric material, which is in turn dependent at least in part upon the maximum tilt to which the bearing may be subjected, and the need to ensure that the elastomer is not subjected to tension under the maximum degree of tilting. The thickness of the elastomer will also be selected so that the required tilting and horizontal deflection can be accommodated by the bearing without overstraining in shear.

Structural engineers are developing and have developed bridge and building designs that place increasing demands upon such bearings, requiring them to accommodate increasing loads without increase of size and cost, and preferably of course with decrease of both size and cost. For example, the known bearings employing one or more open layers of neoprene elastomer have only been used for bridges of relatively short span (i.e. up to about 400 feet). A bearing intended for longer spans has required the neoprene to be completely enclosed, comprising the so-called, relatively expensive "pot" bearing, because of the high stresses to which it is subjected. Bridges of up to 1,600 feet span are now common, and it is to be expected that this trend will continue. There is also an accompanying tendency to reduce the cross-section of the supporting columns as much as possible, so that the situation cannot be met simply by increasing the size of the bearing.

If the horizontal size of the bearing is reduced by use of elastomeric materials capable of higher loading, then because of the shear forces applied to the bearing, as described above, a much thicker layer must be used, and the bearing consequently is much thicker. Problems are also encountered in ensuring a mechanical bond between the elastomer and the other parts of the bearing that will withstand the maximum shear stresses applied thereto.

DEFINITION OF THE INVENTION

It is an object of the present invention to provide a new structural bearing.

It is another object to provide a new bearing employing at least one unrestrained layer of elastomeric material and of simple, inexpensive construction.

In accordance with the present invention there is provided a structural bearing comprising a supporting bearing member for engagement with a structure to be supported by the bearing, at least one layer of elastomeric material interposed between the said supporting bearing member and a support for the bearing when the bearing is in operative position on the support, characterised by the provision of at least one co-operating bearing member capable of shear-resisting pivotal engagement with the said supporting bearing member to permit compression of the elastomer layer and tilting of the supporting bearing member relative to the bearing support under load, the shear-resisting bearing member being adapted for shear-resisting engagement with the said bearing support.

The said co-operating bearing member may comprise a pin passing through the said elastomeric material and having one end in pivotal shear-resisting engagement with the supporting bearing member.

The end of the said pin in engagement with the bearing supporting member is of spherical segment external shape slidably engaged in a cylindrical bore in the bearing member coaxial with the pin, or alternatively there may be provided a collar of complementary internal shape embracing the pin end, the collar exterior being cylindrical and the collar being slidably engaged in a cylindrical bore in the bearing member coaxial with the collar exterior and the pin.

Alternatively, the said supporting and shear-resisting bearing member may comprise plate-like portions on opposite sides of the elastomer layer, one of the bearing members having a surface thereof capable of said shear-resisting engagement with an adjacent surface of the other member, which adjacent surface extends toward the said one member and surrounds its first mentioned surface.

The said shear-resisting engagement may take place upon the application to the bearing of from 50 percent to 75 percent of its maximum designed shear load.

DESCRIPTION OF THE DRAWINGS

Particular preferred embodiments of the invention will now be described, by way of example, with reference to the accompanying diagrammatic drawings, wherein.

DESCRIPTION OF THE PREFERRED EMBODIMENTS

Figure 1:
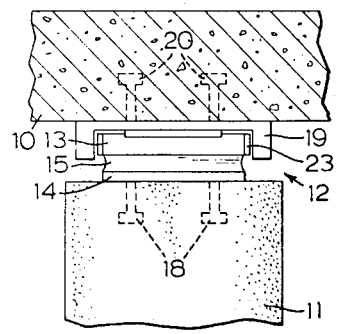
FIG. 1 is a front or rear elevation showing a bearing in accordance with the invention applied in support of a bridge structure.

FIG. 1 illustrates a typical application of a bearing in accordance with this invention to the support of a bridge member 10 on top of a single, slender, vertical column 11, the bearing being indicated generally by the reference 12.

Figure 2:
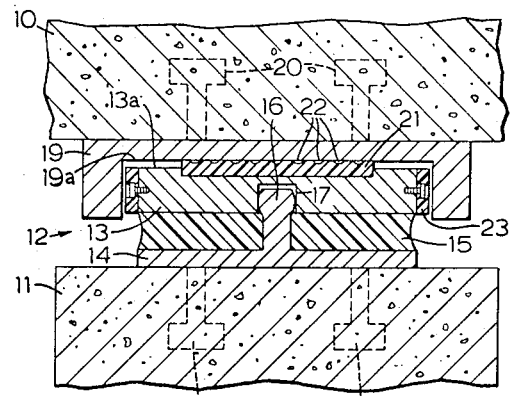
FIGS. 2 to 5 are transverse cross-sections through different embodiments of the invention.

Referring more specifically to FIG. 2, the bearing illustrated therein comprises two spaced, flat, circular plates 13 and 14 having a single, open-sided, uniform, flat cylindrical layer 15 of an elastomeric material interposed between the plates and bonded thereto by any suitable treatment. A massive, solid, shear-resisting pin 16 coaxial with the two plates and the elastomer layer extends between the plates, and transmits any shear force applied to the plate 13 directly to the plate 14, and vice versa, without permitting application of the force to the elastomer layer.

In this embodiment the pin 16 is rigidly connected to the plate 14 by being formed integral therewith, while its end engaging the other plate 13 has the external shape of a spherical segment, which is engaged for vertical sliding movement in a cylindrical bore 17 in the plate 13 coaxial with the pin. The vertical sliding of the pin end in the bore permits the plates to move towards and away from one another, as the thickness of the elastomer layer varies with the applied load, while the pivotal engagement permits relative tilting of the two plates as the supported structure moves on the bearing.

The lower plate 14 is fastened securely to the supporting column 11 in any suitable manner. Since the column illustrated in FIG. 1 is of concrete the plate is provided with downwardly extending anchor pins 18 of conventional form. An inverted U-shape member 19 is similarly connected to the bridge member 10, being provided with upwardly extending anchor pins 20. The facing surfaces 19a and 13a of the member 19 and plate 13 respectively have a layer 21 of low-friction plastic material (e.g., the material sold by DuPont under the Trade Mark "Teflon") interposed between them, so that they may slide easily relative to one another to accommodate the corresponding movement of the bridge on the bearing. The surface of the layer 21 engaging the surface 19a is provided with a large number of shallow recesses 22, each of which contains a suitable lubricant material to reduce the sliding friction. The edges of the plate 13 coextensive with downwardly extending portions 19b of the member 19 are provided with layers 23 of low-friction material to reduce the sliding friction therebetween.

The preferred material for the elastomer layer 15 is a polyurethane and, for example, such a material can accommodate a loading of say 2,000 p.s.i., as compared with a loading of about 800 p.s.i. for neoprene. As a practical example a bearing to withstand a 200 ton load must be of about 26 inches diameter with neoprene, but can be of about 16 inches diameter with polyurethane. Moreover, because of the presence of the pin 60 substantially no shear forces can be applied to the elastomer layer, and its thickness need only be sufficient to accommodate the tilting permitted by the pivotal engagement of the pin with the plate 13. The tilting that is likely to be obtained with any structure can readily be calculated as an angle, and the limitation is that the thickness must be sufficient to ensure that the stretched part of the elastomer layer remains in compression and does not become under tension. In the practical example referred to above the elastomer layer need only be about one inch thick, whereas a prior art neoprene bearing would require the layer to be perhaps four inches thick to accommodate the anticipated shear forces. Also, the bonds between the layer 15 and the plates 13 and 14 are not subjected to any appreciable shear forces, so that limitations otherwise imposed by the possible failure of these bonds are avoided; it is found in general that higher strength elastomers such as the polyurethanes are relatively difficult to bond to metals.

Figure 3:
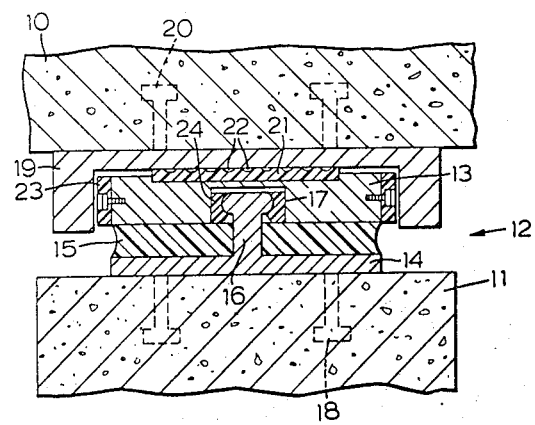

In the embodiment illustrated by FIG. 3 the shear resisting pivotal connection of the pin 16 with the bearing member 13 is by means of a cylindrical collar 24, which has an inner cylindrical surface complementary to that of the end of the pin and closely embraces the pin end. The collar has an external cylindrical surface which is a close sliding fit in the cylindrical bore 17, so that the collar can slide therein to accommodate changes in the thickness of the elastomer layer with load. The embodiments described can of course be inverted.

In all of the embodiments described the connection of the pin 16 with the plate 13 accommodates both tilting movements and vertical movements of the plate 13, since this structurally is the preferred arrangement. However, for example, in the embodiments of FIGS. 2 and 3 it would also be possible for the connection of the pin with the plate 13 to accommodate tilting, while the connection with the plate 14 accommodates vertical movements, the pin being vertically slidable in a suitable bore.

Figure 4:
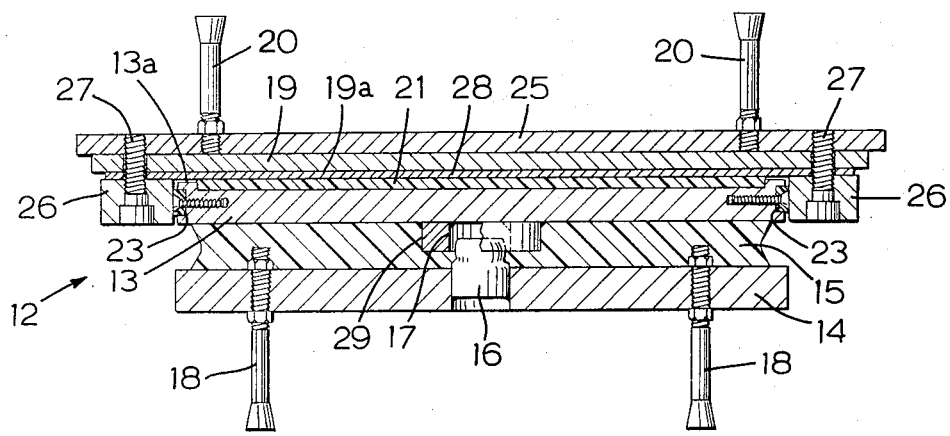

In the embodiment of FIG. 4 the inverted U-shaped member 19 of the preceding embodiments that is illustrated as an integral unit is instead formed in separate parts consituted by a plate 19, another plate 25 carrying the anchor pins 20 which are removable, and side bar members 26, the said separate parts being held together by bolts 27. The plate 14 is provided with removable pins 18. Such a construction permits the bearing to be disassembled for removal and/or maintenance, etc. A thin layer 28 of a material having an especially low coefficient of friction with the material of the layer 21 is clamped to the face of the plate 19 that engages the layer 21; a particularly suitable material is a sheet of polished stainless steel, the use of such a sheet also avoiding the need to polish or accurately machine the corresponding face of plate 19.

The end of the pin 16 projecting beyond the plate 14 is engaged in a co-operating housing 29 fixed to the plate 13, and the cylindrical bore 17 in the housing is of a predetermined greater diameter than that of the pin 16, so that some shear force may be applied to the elastomer layer 15 before the shear-resisting pin member and the housing 29 move into shear-resisting engagement with one another. Preferably, the amount of shear accommodated by the elastomer layer before such engagement takes place is about 50 percent, and may be up to about 75 percent, of the maximum designed shear load of the bearing, the remainder, if ever applied, being accommodated by the shear-resisting pin and housing connection. Such a construction is preferred in some applications and enables a pin 16 of smaller diameter to be used, as compared with the previously described embodiments.

Figure 5:
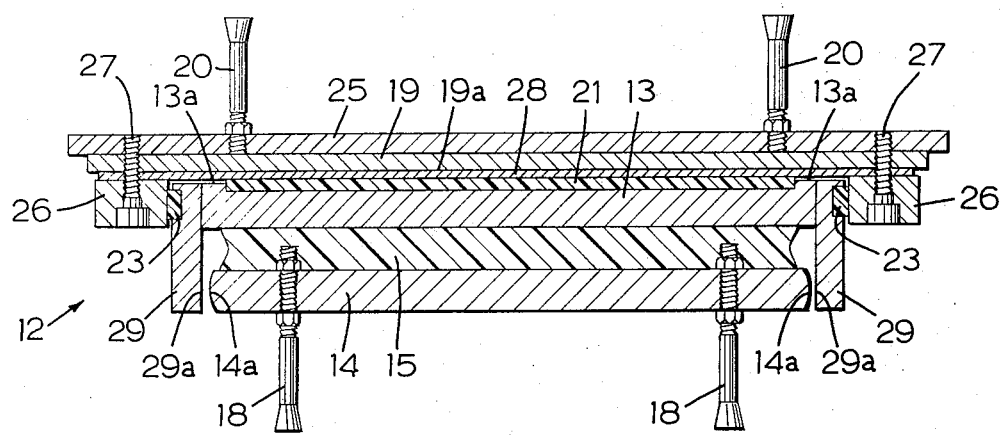

In the embodiment of FIG. 5 the pin 16 effectively becomes merged with the plate 14, which is circular in plan, so that the plate 14 may be regarded as the mechanical equivalent of the pin. The plate is provided with an edge face 14a, shaped like the corresponding face of the pin 16, and co-operating with an internal circular cylindrical face 29a of a ring-like member 29 fixed to the edge of the plate 13, which is also circular in plan. The outer face of the member 29 is rectangular in plan and carries the low-friction members 23 which engage the side bars 26, as with the embodiments described above. The ring 29 could alternatively be fastened to the plate 14 and be extended toward the plate 13 so as to be capable of pivotal engagement with the plate 13 to resist shear forces. The faces 14a are shown curved convex, as is preferred, but alternatively, or in addition, the co-operating face 29a surrounding the surface 14a may be curved concave. It will be noted that although the elastomer is surrounded by the plates 13 and 14 and the circular face 29a it is not physically restrained thereby.

The structure characterising the embodiments of the invention can be applied to other forms of bearing, e.g., a "floating" bearing not requiring the side restraint provided by the bars 26. Other variations of the embodiments described are of course possible within the scope of the claims and will be apparent to those skilled in the art.

I claim:

1. A structural bearing subjected to loads having both vertical and horizontal components comprising, a first support member for mounting upon a structure on which the bearing is supported, an unenclosed layer of elastomeric material mounted on top of the first support member and bonded thereto, a second support member for operative enegagement with a structure supported by the bearing mounted on top of the layer of elastomeric material and bonded thereto, and mechanical connecting means extending between the support members through the layer of elastomeric material and mechanically connecting the support members to one another, the said connecting means comprising a pin fixed rigidly at one end to the centre of one support member, passing vertically centrally through the said elastomer layer, and having its other end of spherical segment external shape slidably engaged in a centrally-disposed, vertical cylindrical bore in the other support member coaxial with the pin, said connecting means permitting movement of the support members toward each other upon compression of the layer of elastomeric material under vertical load components with vertical movement of the said other pin end in the bore, permitting tilting of the support members relative to each other under corresponding components with rotation of the said other pin end in the bore, and preventing transverse movement of the support members relative to each other under horizontal load components of greater than a predetermined extent by engagement of the said other pin end with the wall of the bore to prevent the application to the elastomer layer of shear force of greater than a corresponding value.

2. A bearing as claimed in claim 1, wherein there is provided a collar embracing the pin other end and of internal shape complementary to that of the embraced pin end, the collar exterior being of cylindrical shape coaxial with the pin and the collar being slidably engaged in the said cylindrical bore in the other support member.

3. A bearing as claimed in claim 1, characterized in that shear-resisting engagement takes place between the said other pin end and the wall of the bore upon the application to the bearing of from 50 percent to 75 percent of its maximum shear load.

4. A structural bearing subjected to loads having both vertical and horizontal components comprising, a first circular plate-like support member for mounting upon a structure on which the bearing is supported, an unenclosed layer of elastomeric material mounted on top of the first support member and bonded thereto, a second circular plate-like support member for operative engagement with a structure supported by the bearing mounted on top of the layer of elastomeric material and bonded thereto, and mechanical connecting means extending between the support members around the layer of elastomeric material and mechanically connecting the support members to one another, the said connecting means comprising a circular collar-like member fixed rigidly to one of the support members and having a surface thereof extending to the other support member and surrounding a co-operating outwardly convex circular surface of the other support member, said connecting means permitting movement of the support members toward each other upon compression of the layer of elastomeric material under vertical load components with vertical movement of the other support member within the collar-like member, permitting tilting of the support members relative to each other under corresponding components with rotation of the said other support member in the collar-like member, and preventing transverse movement of the support members relative to each other under horizontal load components of greater than a predetermined extent by engagement of the said other support member with the collar-like member to prevent the application to the elastomer layer of shear force of greater than a corresponding value.

5. A bearing as claimed in claim 4, characterized in that shear-resisting engagement takes place between the cooperating surfaces of the collar-like member and the other support member upon the application to the bearing of from 50 percent to 75 percent of its maximum shear load.

* * * * *